W. H. REISNER & V. E. MIDDLEKAUFF.
INDICATING SURFACE GAGE.
APPLICATION FILED MAR. 31, 1909.
968,884.
Patented Aug. 30, 1910.
2 SHEETS—SHEET 1.
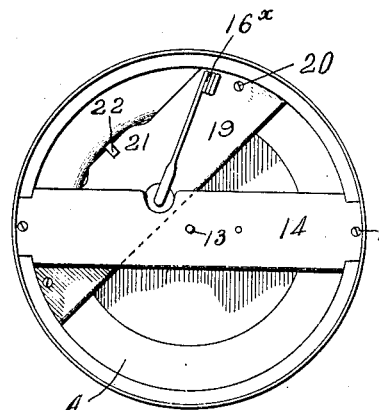
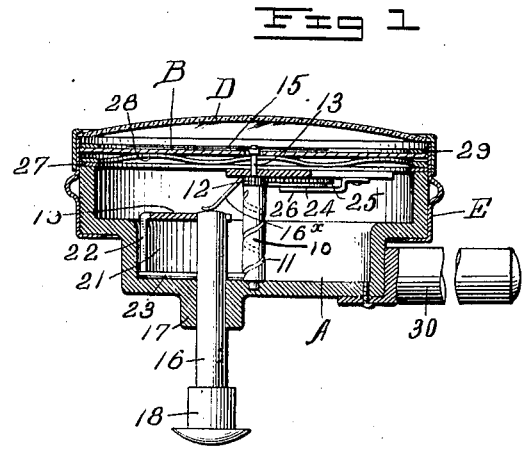
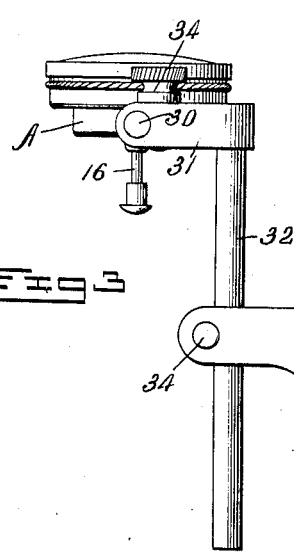
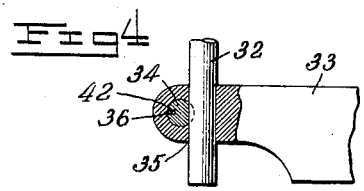
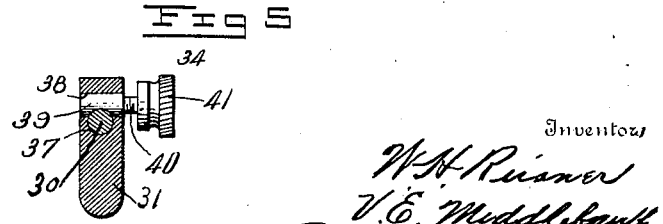

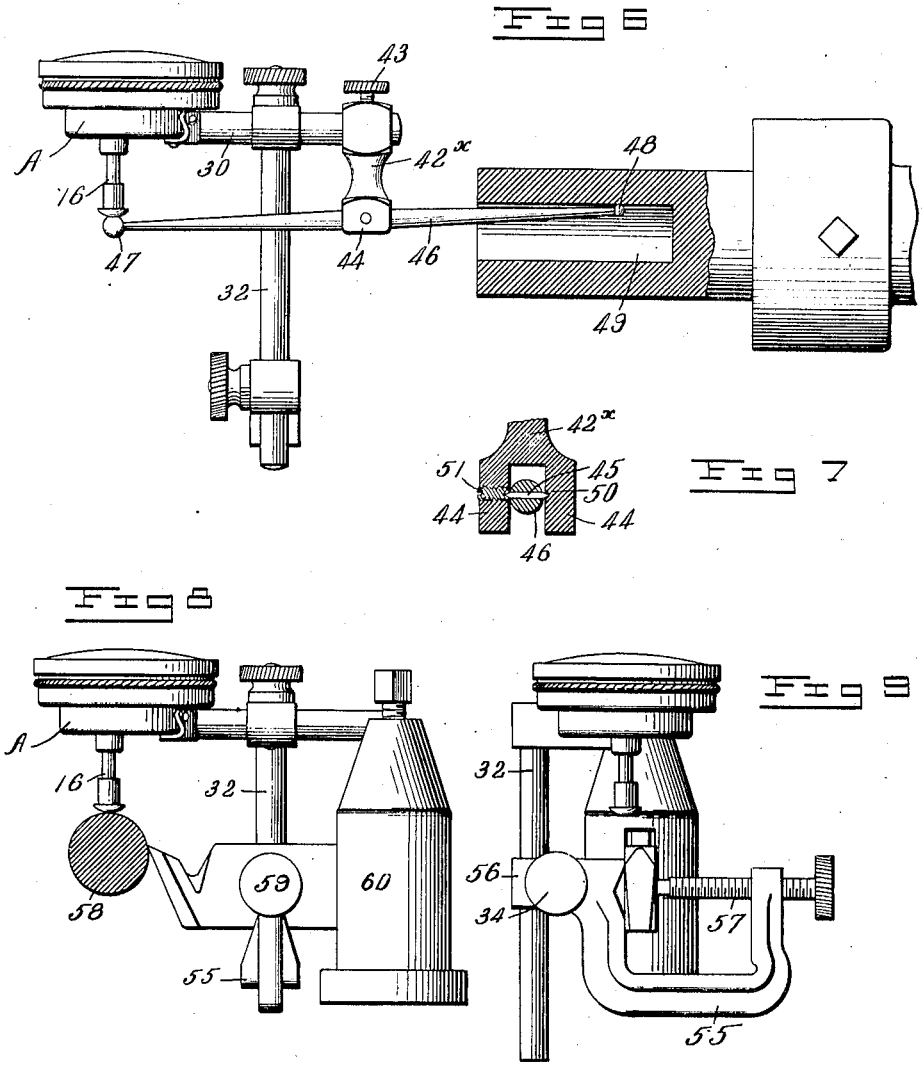

UNITED STATES PATENT OFFICE.

WILLIAM H. REISNER AND VICTOR E. MIDDLEKAUFF, OF HAGERSTOWN, MARYLAND.

INDICATING SURFACE-GAGE.

968,884.  Specification of Letters Patent.  Patented Aug. 30, 1910.

Application filed March 31, 1909. Serial No. 487,036.

*To all whom it may concern:*

Be it known that we, WILLIAM H. REISNER and VICTOR E. MIDDLEKAUFF, both citizens of the United States, and both residing at Hagerstown, in the county of Washington and State of Maryland, have invented certain new and useful Improvements in Indicating Surface-Gages; and we do hereby declare the following to be a full, clear, and exact description of the invention, such as will enable others skilled in the art to which it appertains to make and use the same.

This invention relates to indicating surface gages and more particularly to gages of this type such as described in Letters Patent, No. 773,983, granted to William H. Reisner, on November 1st, 1904.

One of the objects of the invention is to simplify greatly the interior mechanism of the gage shown and described in the patent referred to. It is aimed to reduce the number of operative parts of the mechanism to a minimum and also to provide a construction in which the geared connection between the grooved barrel and the pointer-carrying arbor is dispensed with, as such a connection makes the instrument more or less inaccurate due to the play between the gears and the impossibility of cutting their teeth with the requisite exactness and accuracy. According to this invention, the grooved barrel is located centrally in the case or cup of the gage and carries the pointer directly, the actuating push-pin being arranged eccentrically, instead of concentrically, with respect to the case.

A further object of the invention is to provide improved means for mounting the gage so that it may be readily mounted in the tool-post of a lathe, or in a similar place, in such a manner as to be adjustable in a number of ways with respect to the work.

The invention also purposes the provision of an improved attachment adapted for use with the gage to indicate when a bore or other cavity formed in the work is of greater or less diameter at its inner portion than at its mouth or off center with respect to the center of the lathe, or other machine in which the work is held.

A still further object of the invention is to provide an improved attachment by which the gage may be clamped on a metal cutting tool, such as used in a lathe, shaper, or planer, and properly adjusted with respect to the work.

In the accompanying drawings, Figure 1 is a vertical central section through a gage embodying the invention. Fig. 2 is a top plan view of the gage with the crystal and dial removed to show the interior mechanism. Fig. 3 shows the mounting for the gage by which it is held in the tool-post of a lathe. Fig. 4 is a detail of the connection between the supporting post of the gage and the bar which is clamped in a tool-post. Fig. 5 is a detail section of the device for adjustably clamping the gage on its supporting post. Fig. 6 is a front elevation of the gage and the attachment used therewith to test the accuracy of a bore or cavity. Fig. 7 is a detail section of the mounting for the actuating lever shown in Fig. 6. Fig. 8 is a side elevation of the gage mounting by which the gage is clamped directly on to a tool, and Fig. 9 is a front elevation of the parts shown in Fig. 8, the work being removed.

Referring to the drawing, and more particularly to Figs. 1 and 2, A denotes the cup or case of the gage, which is of substantially the same form as according to the patent mentioned above; B indicates the dial, which may be graduated in any suitable manner; and D denotes the crystal. The dial B is carried by an upper rotary case section E adapted for rotation to bring the zero mark on the dial to the point of rest of the hand or pointer as according to the prior patent referred to. Journaled in a step bearing formed in the bottom of the case at its center is an upright barrel 10 provided with a helical groove 11. Above the grooved portion of said barrel the same has a pinion 12 cut therein, and above said pinion the barrel 10 is reduced in diameter to form a hand-supporting arbor 13 which is journaled in a bridge 14 extending across the case horizontally at its upper part. At its upper end the arbor 13 carries the hand or pointer 15 which sweeps the dial. The helically grooved barrel 10 is rotated by means of a push-pin 16 movable in upward and downward direction through a boss 17 formed on the bottom of the case and located eccentrically of the latter, said push-pin carrying at its lower end a suitable button 18 to contact with the work. Said pin is guided at its upper end in a bridge 19 located beneath the bridge 14 and directed at an angle thereto, as shown in Fig. 2. Both of these bridges are detachably set in position in the case by means of screws 20. The bridge 19 carries at one side a depending lip 21 extending downward in close proximity to the wall of the case as shown in Fig. 1, and provided with an upright slot 22. This slot serves to guide one end of a transverse pin 23 extending through and rigidly fixed in the push-pin 16, the opposite end of this cross pin 23 engaging in the helical groove 11 of the rotary barrel 10. By means of this mechanism the last named end of the cross pin 23 is guided upward and downward in a right line, thus causing rotation of the barrel and the sweeping of the dial by the hand or pointer 15. The push pin 16 is normally maintained in depressed position, in which the cross pin 23 is at the lower extremity of the helical groove 11, by means of a spring 16× of suitable form illustrated as mounted on the lower bridge 19, as shown in Fig. 2. Said spring is assisted by a hair spring 24 acting on a small gear wheel 25 which is in mesh with the pinion 12 on the barrel. The hair spring 24 thus acts directly on the barrel at the same time the spring 16× acts on the push-pin so that after an actuation of the device the parts are returned to the position shown in Fig. 1, with great rapidity. The gear 25 is journaled between the upper bridge 14 and a small bracket 26 applied to the lower surface thereof, as shown. Upon the upper edge of the case a spring washer 27 is placed, said washer being substantially flat and supporting a spring washer 28 of undulating form, upon which the dial B rests. A third washer 29 rests upon the upper face of the dial at its circumference and this washer is suitably locked to the rotatable case section E. By means of these washers the dial is firmly held in position and at the same time its rotation with respect to the case A is facilitated.

With the foregoing description at hand, it will be readily understood that when the push-pin 16 is forced upward by contact with any inequality in the surface to be tested, rotary movement will be imparted to the barrel by the cross pin 23, the upward movement of said cross pin in the helical groove causing the sweeping of the dial by the hand, in order to indicate the surface inequality. This actuation of the device is opposed by the spring 16× and the hair spring 24 and as soon as the push-pin is removed from contact with the work, these springs will instantly return the push-pin and the grooved barrel to their normal positions. The case section E can be rotated in order to bring the zero mark of the dial directly to the point of rest of the hand or pointer, thus insuring ease and accuracy in reading off the measurements.

The geared connection between the grooved barrel and the pointer-carrying arbor as described in the prior patent referred to, is entirely dispensed with and the connection between the barrel and hand or pointer is direct and positive. In the present construction, the gears 12 and 25 have no effect whatever on the accuracy of the instrument, as they only act to transmit the power of the hair spring 24 to the hand-carrying barrel to hold it normally in such position that the cross pin 23 is engaged with the lower extremity of the helical groove.

With an instrument constructed as above described, the few operative parts may be made with such accuracy that the instrument will indicate accurately measurements as small as a thousandth of an inch.

The gage is mounted with respect to the work by means of the following devices. Applied to the lower part of the case and extending laterally therefrom is a smooth cylindrical arm or rod 30, as shown in Figs. 1 and 6, and when the instrument is to be used in connection with work in a lathe, this lateral arm 30 is adjustably secured in a lateral bracket 31 carried at the upper end of a supporting post 32, said post being in turn adjustably connected with the forward end of a bar 33 adapted to be clamped in a tool post as indicated in Fig. 3. By the various adjustable connections described, the gage may be brought into coöperative relation with the work irrespective of the size and location of the latter. The adjustable connections between the lateral arm 30 and the bracket 31 and between the supporting post 32 and the tool post bar 33 are of novel form, the bracket 31 and bar 33 being provided with intersecting openings in either one of which the arm 30 or post 32 respectively may be placed while the other serves to receive a set screw 34. Fig. 4 shows the connection between the tool post bar and the supporting post of the gage, and in this figure, 35 denotes one of the openings and 36 the opening which intersects the same at right angles. In Fig. 5, which illustrates the adjustable connection between the lateral arm 30 and the bracket 31, one of the openings in the bracket is denoted by 37 and the other by 38. It will be noted that the set screw 34 embodies a cylindrical portion 39 having a cutaway part adapted to fit around the arm in the other opening, and said cylindrical part 39 has threaded into it the shank 40 having the milled head 41. When the milled head is rotated, the cylindrical part 39 is drawn out as far as possible from the opening in which it is positioned, thus securely clamping the arm or post in the other opening. During this operation, the milled head is supported by the bracket 31 and held relatively fixed. In order to put the parts together, the set screw is first placed in its opening and a spring 42 applied to the cylindrical part 39 frictionally holds it in such position that when it is once placed ready for the reception of the arm or post in the other opening, it will not be dislocated. The arm or post to be held in position is then inserted in its opening and the cutaway part of the cylindrical portion 39 of the set screw is then clamped against the same.

Fig. 6 illustrates the attachment for indicating inaccuracies in a bore or cavity. Said attachment comprises a hanger 42$^x$ adjustably clamped by means of a set screw 43 on the end of the lateral arm 30, which arm is supported in any suitable manner, such as that shown. The lower portion of the hanger 42$^x$ is bifurcated to form cheeks 44 between which is pivoted by means of a cross pin 45 an actuating lever 46 having at one end a small ball 47 adapted to engage the push-pin 16 of the gage and provided at the opposite end with a small ball or sphere 48 adapted to enter the bore 49 which is to be tested as to its accuracy. Due to the fact that the sphere or ball 47 is larger and heavier than ball 48, the lever 46, which is pivoted exactly at its center, will normally assume the position shown in Fig. 6, in which the ball 47 hangs down as far as is permitted by the formation of the center bearing for said lever, the lever when so adjusted having no effect upon the gage, though the parts are so adjusted that the push-pin 16 will bear lightly against the ball 47. The actuating lever 46 is accurately adjusted in its bearings in order to move with a minimum of friction, and to this end the extremities of the cross pin 45 are made conical, one of them fitting in a correspondingly formed notch 50 in one of the bearing cheeks, while the other is engaged by a similar notch formed in the inner end of a small screw plug 51. By screwing in the small plug 51 more or less, the adjustment of the lever in its bearing is afforded and by withdrawing the screw plug to the necessary extent, the lever may be removed altogether, as will be understood. When the parts are in the position shown in Fig. 6, any inaccuracy in the bore 49 of the work will cause the depression of the smaller ball-shaped terminal 48 of the lever and as said terminal is at the same distance from the center bearing of the lever as the terminal 47, this latter will push up the push-pin to a corresponding extent, the gage thus being actuated to indicate the inequality. This attachment is of great value in determining any surface inequality in a bore or cavity and in testing whether the inner portion of the bore as it is formed is of the same diameter as the outer portion and properly centered with respect to the work.

It is sometimes desired to clamp the gage and its supporting parts directly on to the tool of a lathe, shaper, or similar machine, and with this end in view, we have provided the attachment illustrated in Figs. 8 and 9. The attachment consists essentially of a U-shaped clamp 55 one of the arms of which has a laterally extended lug 56 at one side in which the supporting post 32 of the gage may be mounted as shown. Said lug 56 is preferably provided with two intersecting openings or bores similar to those formed in the bracket 31 and tool-post bar 33 above described, so that the supporting post 32 may be adjustably clamped in either of said openings by means of one of the set screws 34, as best shown in Fig. 9. The clamp 55 is clamped to the tool by means of a screw 57 operating in one of the arms of the clamp. When the parts are in the position shown, the gage will overhang the work, denoted by reference character 58, in such a manner that the push-pin 16 can be brought into coöperative relation with the same. Although the clamp is shown as clamped against the sides of the tool, it may also be clamped against the upper and lower edges of the tool, as will be obvious. The tool is illustrated as clamped in the tool post 60 of a lathe, but it is apparent that substantially the same arrangement of clamp and mounting for the gage may be employed in connection with the tool of a shaper or similar machine.

We claim:—

1. In a surface gage, the combination of a case, a bridge extending across the case, a push pin guided vertically in the bridge, a second bridge above the first, and a pointer-carrying barrel journaled in the second bridge and rotated by said push pin.

2. In a surface gage, the combination of a case, a transverse bridge in the case, a sliding push pin guided in an opening in the bridge and carrying a cross pin, a down-turned slotted lip formed on the bridge to engage said cross pin directly and guide it in a right line, and a grooved pointer-carrying barrel engaged by the cross pin.

3. In a surface gage the combination of a case, a bridge extending across the same, a pointer-carrying barrel journaled in the case and in the bridge and carrying a pinion, a spring controlled gear mounted on the bridge and meshing with said pinion, and means to rotate the barrel.

4. In a surface gage, the combination of a rotary barrel, a pinion formed on said barrel at its upper part, an arbor forming an upward extension of the barrel and carrying a pointer, a bridge in which said arbor is journaled, a bracket carried by the bridge, a gear journaled between the bracket and the bridge and meshing with said pinion, a hair spring acting on said gear, and means to rotate the barrel against the action of said hair spring.

5. In a surface gage, the combination of an upright rotary pointer-carrying barrel having a helical groove, a bridge located alongside the barrel and having at one edge a vertically directed part with an upright slot, a sliding push-pin, and a cross pin carried by the push-pin and engaged at one end in said slot and at the other end in the groove of said barrel.

6. In a surface gage mounting, the combination of a member having intersecting openings or bores of the same diameter, a gage-supporting member fitting in either bore, and a clamping or set screw for said member also fitting in either bore.

7. The combination with a supporting member having openings or bores of equal diameter intersecting each other at right angles, of a set screw having a cut away cylindrical part to fit in either bore, a headed shank threaded into said cylindrical part at one end of the latter, and a member clamped in the other bore by engagement with the cut away portion of said part.

8. The combination with a surface gage embodying a case and a vertically movable push-pin, of a supporting arm extending laterally from the case, a hanger adjustably clamped on said arm, and a lever fulcrumed at its center in said hanger and adapted to contact at one end with the push-pin in order to actuate the same.

9. The combination with a surface gage embodying a push-pin, and a supporting arm for the gage, of a hanger carried by said arm, and a lever fulcrumed at its center in said hanger and adapted to contact at one end with the push-pin in order to actuate the same, said end of the lever being weighted to normally hold it depressed.

10. The combination of a U-shaped clamp having a lug extending laterally from one of the arms thereof, said lug having intersecting openings, means to secure said clamp on a tool, a post passing through one of the openings in said lug, and a set screw in the other opening to hold said post in adjusted position in the lug, the post and set screw being interchangeable in said openings.

In testimony whereof we affix our signatures, in presence of two witnesses.

WILLIAM H. REISNER.
VICTOR E. MIDDLEKAUFF.

Witnesses:
CHAS. E. BARCHLET,
R. H. ALEY, Jr.